(12) United States Patent
Andersson

(10) Patent No.: US 11,752,601 B2
(45) Date of Patent: Sep. 12, 2023

(54) MOUNTING DEVICE FOR INSULATION HOLDERS

(71) Applicant: EUROSPACERS AB, Gothenburg (SE)

(72) Inventor: Stefan Andersson, Stenkullen (SE)

(73) Assignee: EUROSPACERS AB, Gothenburg (SE)

(*) Notice: Subject to any disclaimer, the term of this patent is extended or adjusted under 35 U.S.C. 154(b) by 646 days.

(21) Appl. No.: 16/962,820

(22) PCT Filed: Jan. 18, 2019

(86) PCT No.: PCT/SE2019/050033
§ 371 (c)(1),
(2) Date: Jul. 16, 2020

(87) PCT Pub. No.: WO2019/143286
PCT Pub. Date: Jul. 25, 2019

(65) Prior Publication Data
US 2021/0129299 A1 May 6, 2021

(30) Foreign Application Priority Data
Jan. 18, 2018 (SE) .................................... 1850054-6

(51) Int. Cl.
*B25B 21/00* (2006.01)
*B25B 15/06* (2006.01)
*E02D 31/00* (2006.01)

(52) U.S. Cl.
CPC ............ *B25B 21/002* (2013.01); *B25B 15/06* (2013.01); *E02D 31/00* (2013.01)

(58) Field of Classification Search
CPC ....... B25B 15/06; B25B 21/002; F16B 35/06; F16B 13/00; E04B 1/62; E04F 13/08
See application file for complete search history.

(56) References Cited

U.S. PATENT DOCUMENTS 591,097 A * 10/1897 Goodell et al. ......... B25B 15/06
74/127
1,838,957 A * 12/1931 Orawiec ................. B25B 15/06
81/DIG. 2
(Continued)

FOREIGN PATENT DOCUMENTS

DE 198 40 521 C1 2/2000
EP 3150773 A1 4/2017
(Continued)

OTHER PUBLICATIONS

European Search Repod issued for European Patent Application No. 19740704.2, dated Sep. 3, 2021 in 6 pages.
(Continued)

*Primary Examiner* — Jason L Vaughan
(74) *Attorney, Agent, or Firm* — Knobbe, Martens, Olson & Bear, LLP

(57) ABSTRACT

Mounting device for inserting insulation holders into insulation material, where the mounting device comprises a drive head adapted to drive the insulation holder through a central opening of the head portion of the mounting device, where the central opening is provided with a threaded portion, where the lead pitch of the threaded portion is at least 30 millimetres. The advantage of the invention is that insulation holders can be inserted into insulation material in an easy and cost-effective way. An insulation holder can be driven completely through the central opening since the insulation holder does not have a protruding head. The insulation holder is provided with a thread corresponding to the thread of the central opening, such that the insulation holder is screwed into the insulation material.

15 Claims, 6 Drawing Sheets

(56) References Cited

U.S. PATENT DOCUMENTS

| | | | | |
|---|---|---|---|---|
| 2,947,334 A | * | 8/1960 | Issartel | ............ B25B 15/06 |
| | | | | 74/127 |
| 4,295,394 A | | 10/1981 | Decaro | |
| 5,730,035 A | * | 3/1998 | Ohmori | ............ B25B 23/045 |
| | | | | 81/57.44 |
| 5,992,274 A | * | 11/1999 | Lammers | ............ B25B 23/08 |
| | | | | 81/451 |
| 2014/0305068 A1 | * | 10/2014 | Svanberg | ............ E04D 3/362 |
| | | | | 206/340 |
| 2019/0275653 A1 | * | 9/2019 | Nguyen | ............ F16B 13/002 |

FOREIGN PATENT DOCUMENTS

| | | |
|---|---|---|
| EP | 3740687 A1 | 11/2020 |
| JP | 2009-23063 A | 2/2009 |
| WO | 2007/035090 A1 | 3/2007 |

OTHER PUBLICATIONS

International Search Report and Written Opinion for the International Application No. PCT/SE2019/050033, dated Apr. 12, 2019 in 12 pages.

* cited by examiner

MOUNTING DEVICE FOR INSULATION HOLDERS

CROSS-REFERENCE TO RELATED APPLICATIONS

This application is the U.S. National Phase under 35. U.S.C. § 371 of International Application PCT/SE2019/050033, filed Jan. 18, 2019, which claims priority to Swedish Patent Application No. 1850054-6, filed Jan. 18, 2018. The disclosures of the above-described applications are hereby incorporated by reference in their entirety.

TECHNICAL FIELD

The present invention relates to a mounting device for inserting insulation holders in insulation panels and/or insulation blocks. Insulation panels are used to create a large insulation bed for a concrete foundation. The separate insulation panels are held together by insulation holders inserted through the insulation panels.

BACKGROUND ART

Concrete constructions are normally provided with some kind of reinforcement to increase the strength and to prevent cracking. The reinforcement can be single reinforcement bars (rebars), reinforcement grids/meshes or different kinds of fibres or other. Most common are reinforcement grids/meshes made from reinforcement bars of steel when larger areas are to be covered in a fast and time-efficient manner. For smaller areas or as a complement to the grids, single reinforcement steel bars are often used.

The concrete construction, i.e. the foundation, may be placed directly on the ground or may be placed on insulation. The insulation often consists of large blocks or panels of an insulation material, e.g. of expanded polystyrene (EPS) or extruded polystyrene foam (XPS). These materials comprise closed cells, which gives rigid and tough insulation plates or blocks, which in turn will give the foundation a low thermal conductivity.

The insulation bed is often assembled from a plurality of insulation panels arranged in one or more layers. In order to provide a higher strength and a lower thermal conductivity, the insulation panels may be stacked with one or more overlapping layers. The insulation panels are often attached to each other with insulation nails or insulation screws in order to hold the insulation panels together and to minimize the distance between the insulation panels. The insulation panels are attached to each other by the use of the nails or screws, often by attaching two or three layers to each other at the time. The screws of the top layer may not be inserted all the way, such as part of the screw sticks out of the top insulation layer. This will allow the concrete to include the screw heads in the concrete, such that the insulation will be attached to the concrete even if the ground under the insulation should sink. The nails may also be used to attach the insulation panels to the concrete.

The insulation nails or screws thus have two main purposes. One purpose is to attach the insulation panels to each other, the other purpose is to attach the insulation panels to the casted floor, wall or foundation.

An insulation nail resembles an ordinary nail, but the head is larger and flat, the nail is made from plastic material and the tip is provided with barbs. One nail at the time is inserted into the insulation by first inserting the tip into the insulation by hand, and then pressing the complete nail into the insulation by hand, a foot or a hammer. The insertion of a nail is thus relatively slow and requires the user to bend down each time a nail is inserted. A further disadvantage of insulation nails is that the barbs will deform the insulation during the insertion, which will decrease the possible holding force of the insulation nails. Insulation nails are thus mostly used to hold insulation panels together preventing horizontal movements, and not when the insulation is to be attached to the foundation. Further, since the holding force for the insulation nail is between the head and the barbs at the tip, the length of the nail must be selected in dependency of the dimensions of the insulation panels.

An insulation screw resembles an ordinary screw, but is larger with a larger head and with a thread arranged only at the tip of the screw. Insulation screws are commonly used when insulation is to be attached to concrete in a vertical direction. The insulation screw is normally inserted by using an electric screwdriver but a user must normally bend down to start the insertion. With a long screw bit, the user may stand up during most of the insertion. The insertion will even though be relatively slow, since the complete screw must be screwed in to the insulation. Insulation screws are further relatively expensive. Since the holding force for the insulation screw is between the head and the threads at the tip, the length of the screw must be selected in dependency of the dimensions of the insulation panels.

One disadvantage of an insulation screw is that the insulation screw is designed to pull itself into the insulation material with the threaded section. If the user does not apply an appropriate pressure on the insulation screw during the insertion, or does not use an appropriate rotational speed to rotate the insulation screw, the threaded section may instead function as a drill that will destroy the insulation material around the threaded section. In this case, the insulation screw will provide a minimum of holding force. This problem is especially cumbersome for low-density insulation materials.

Insulation nails and insulation screws of the above described types functions, but are relatively time consuming to insert and relatively costly to use. There is thus room for an improved mounting device and method for inserting insulation holders.

DISCLOSURE OF INVENTION

An object of the invention is therefore to provide an improved mounting device for inserting insulation holders. A further object of the invention is to provide an improved method for inserting insulation holders.

The solution to the problem according to the invention is described in the characterizing part of claim 1 regarding the mounting device and in claim 14 regarding the method. The other claims contain advantageous embodiments and further developments of the mounting device and the method.

In a mounting device for inserting insulation holders in insulation material, where the mounting device comprises a drive means having a drive head adapted to move from a start position to an end position with a non-rotating movement, where the drive head is adapted to drive an insulation holder into the insulation material, where the mounting device comprises an elongated body having a central channel having a receiving position adapted to hold an insulation holder before insertion, and a head portion comprising a central opening, the object of the invention is achieved in that the central opening is provided with a threaded portion, where the lead pitch of the threaded portion is at least 30 millimetres.

By this first embodiment of the mounting device according to the invention, a mounting device that is adapted to insert an insulation holder into insulation in a quick and reliable way is provided. The mounting device is intended to be used to attach two or more insulation panels to each other, e.g. when creating an insulation bed for a foundation. An insulation holder is inserted into the mounting device and the drive means will then drive the insulation holder through the lower central opening of the mounting device and into the insulation material. The central opening is provided with a threaded portion that will cooperate with a thread of the insulation holder. The drive head will push the insulation holder through the central opening with a non-rotating movement, and the threaded portion of the central opening will cause the insulation holder to rotate into the insulation material. By providing the central opening and the insulation holder with a sufficiently long lead pitch, the insulation holder will be able to rotate through the central opening without being restricted by contact friction.

The drive means can drive the insulation holder completely through the threaded portion of the central opening. For this reason, the insulation holder does not comprise a head having a diameter that exceeds the body of the insulation holder. By inserting the insulation holder completely through the central opening, the insulation holder can be inserted in one operation step, which will save time. Since the drive means can be operated when the user stands up straight, the ergonomic of the insertion is improved. With the inventive mounting device, a user can insert several insulation holders after each other without having to bend down.

The drive head is adapted to not rotate during insertion of an insulation holder. The central opening of the head portion of the mounting device is provided with a threaded portion. For a simple insulation holder, e.g. an insulation nail without a head or a plain straight pin, the insulation holder can be pushed through the central opening without interaction with the threaded portion. The shape of the central opening may be adapted to the shape of the used insulation holder. For an insulation nail without a head, e.g. a cross-shaped opening may be used.

When an insulation holder having at least one thread is used, the threaded portion of the central opening corresponds to the thread of the used insulation holder. Before insertion, the insulation holder is held in place with the tip of the insulation holder at the central opening. When the drive head is moved downwards, the insulation holder is pushed through the central opening, and the thread of the insulation holder and the thread of the threaded portion will cause the insulation holder to rotate. Since the head portion of the mounting device bears on the insulation material, the insulation holder will be inserted into the insulation with a rotating movement. When the drive head has passed through the threaded portion of the central opening, the insertion is completed. The drive head can return to the idle position by the user pulling the drive head upwards, or by a spring loaded return mechanism.

The insulation holder can be provided with one or more threads, e.g. two, three or four threads. The lead pitch is preferably relatively long, such that the insulation holder will be inserted with relatively few rotations. Thread pitch is defined as the axial distance between adjacent threads on a screw. The lead pitch of the screw is the distance along the screw's axis that is covered by one complete rotation of the screw. For a multiple start screw, the lead pitch is equal to the number of threads or number of starts multiplied with the thread pitch. For a single start screw, the thread pitch is equal to the lead pitch. In order to increase the holding force for an insulation holder having a long lead pitch, it is preferred to provide the insulation holder with several threads, e.g. two, three or four threads. The lead pitch is preferably at least 30 mm, and is in one example 80 mm with four threads. The relation between the outer diameter and the core of the insulation holder can also be increased in order to increase the holding force.

A further advantage of using insulation holders with a thread in the form of an insulation screw is that it can be inserted into insulation material without the risk of damaging the insulation material. A conventional insulation screw is designed to pull itself into the insulation material with its threaded section. If the insulation screw is inserted without an appropriate pressure on the insulation screw during the insertion, or if the insulation screw is inserted without an appropriate rotational speed, the threaded section of the insulation screw will function as a drill that will destroy the insulation material around the threaded section. In this case, the insulation screw will provide a minimum of holding force.

With the inventive mounting device, the insertion and rotation of the insulation screw is controlled by the threaded portion of the central opening. In this way, the insulation screw only rotates when it is pushed downwards. It is thus ensured that the insulation screw is inserted into the insulation material with a rotational movement. The rotation will create a passage in the insulation material having a threaded shape. If required, the insulation screw can be inserted further into the insulation material when it has passed the threaded section of the central opening, since it will continue to follow the created threaded passage if it is pushed further down.

It is preferred to have a relatively long lead pitch, which will allow the insulation holder to get a good grip in the insulation material, since there will be enough insulation material between each thread. A relatively long lead pitch will also allow for the insulation holder to be pushed through the threaded portion of the central opening with a time saving non-rotating movement. With a short lead pitch, the friction in the threaded portion will be too high to allow an insulation holder to be pushed through without a rotational movement of the drive head. The lead pitch and the width of the insulation holder may also depend on the insulation material used. Some insulation materials are relatively porous with a low density while other insulation materials are denser with a higher density. A porous insulation material is more suited for a longer lead pitch.

The drive head is provided with a gliding surface that will glide against the head of the insulation holder when a threaded insulation holder is used. The head portion of the mounting device may be provided with a central opening that is adapted to be used for both threaded insulation holders and straight insulation holders. In this case, the central part of the central opening allows for a straight insulation holder to pass, and the threaded portion allows for a threaded insulation holder to interact with the threaded portion, such that the insulation holder will rotate during the insertion.

The drive head is guided in a central channel of the mounting device. The central channel is provided with a longitudinal slot on one side, such that an insulation holder can enter the interior of the mounting device from the side. In this way, an insulation holder can enter the mounting device without having to remove the drive head of the mounting device each time an insulation holder is to be loaded into the mounting device. A user can insert a single insulation holder through the slot, but preferably the mounting device is provided with a removable magazine arranged at the receiving position of the mounting device, such that an automatic loading of insulation holders can take place. The magazine is preferably reusable and may be loaded with new insulation holders by a user.

The drive means of the mounting device may be either operated manually or by an electric motor. A manually operated drive means may comprise a handle and/or a foot pedal. When an electric motor is used for the drive means, the rotation of the motor is preferably transferred to a non-rotating movement of the drive head. A non-rotating drive head is achieved by e.g. providing the inside of the body with an internal thread or groove which cooperates with a thread or pin of the drive head, which glides in a groove or the like. It would e.g. be possible to adapt the mounting device such that it can use any commercially available electric screwdriver as the drive means.

With a manually operated drive means, the mounting device is provided with a handle and/or a pedal that is adapted to move the drive head from a start position to an end position. In one example, the drive means is a handle. The handle is connected to the drive head by a rod, and when the handle is pressed down, the drive head is pressed down and will push the insulation holder down into the insulation material.

In another example, a foot pedal adapted to be operated by the foot of a user is used. The pedal is applied at the lower end of the mounting device, such that it is easy to reach with a foot. The height of the pedal is adapted to the length of the insulation holder that is to be inserted. The height of the pedal may be adjusted to correspond to the used insulation holder. When an insulation holder is loaded into the mounting device, the pedal is pressed such that the drive head moves from the start to the end position and the insulation holder is inserted into the insulation material. The pedal may be connected to the handle, such that a user may use either a hand or a foot to insert an insulation holder.

The drive head has a stroke length corresponding to the longest insulation holder that is to be inserted. The length of an insulation holder may e.g. vary between 5 cm to up to 40 cm. The stroke length of the drive head is thus preferably in the same region. In one example, the stroke length of the drive head may be adjusted to the actual length of an insulation holder. In this way, no excessive travel of the drive head must be performed every time an insulation holder is inserted.

The start position of the drive head is in one example adjustable to a selected position. In this way, it is possible to adapt the start position of the drive head to the length of the used insulation holder.

The end position of the drive head is in one example adjustable to a selected position. The end position is normally set to the position in which the insulation holder has been inserted into the insulation, and where the drive head is aligned with the bearing surface of the head portion. The end position may be set such that the insulation holder is not completely inserted at the end position. The insulation holder may in this case extend out of the insulation material by up to a few centimetres, and extends preferably by between 1-3 cm. With the insulation holder extending out of the insulation material, the concrete of the foundation will cover the extended part of the insulation holder such that the insulation holders will be fixed to the concrete. The insulation will now be attached to the foundation in a secure way even if the ground will sink.

It may also be possible to adjust the end position to a position in which the drive head extends into the insulation material. In this way, the insulation holder can be inserted deeper into the insulation. This may e.g. be of advantage when straight insulation holders are used, and where the purpose of the insulation holders is to hold the insulation panels together sideways, where shorter insulation holders may be used.

In the method for inserting an insulation holder provided with a lead pitch of at least 30 millimetres into insulation material, using a mounting device, the following steps are comprised. An insulation holder is placed inside the mounting device. The insulation holder may be placed in the mounting device one by one, or may be placed in position automatically from a magazine loaded with insulation holders. The mounting device is placed to bear against the insulation material with a bearing surface comprised in a head portion of the mounting device. The insulation holder is driven into the insulation material by the mounting device, where the insulation holder is driven through the threaded portion of the central opening of the mounting device, where the central opening is provided with a threaded portion corresponding to the thread of the insulation holder. The drive head may be aligned with the bearing surface when the insulation holder is inserted in the isolation material.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
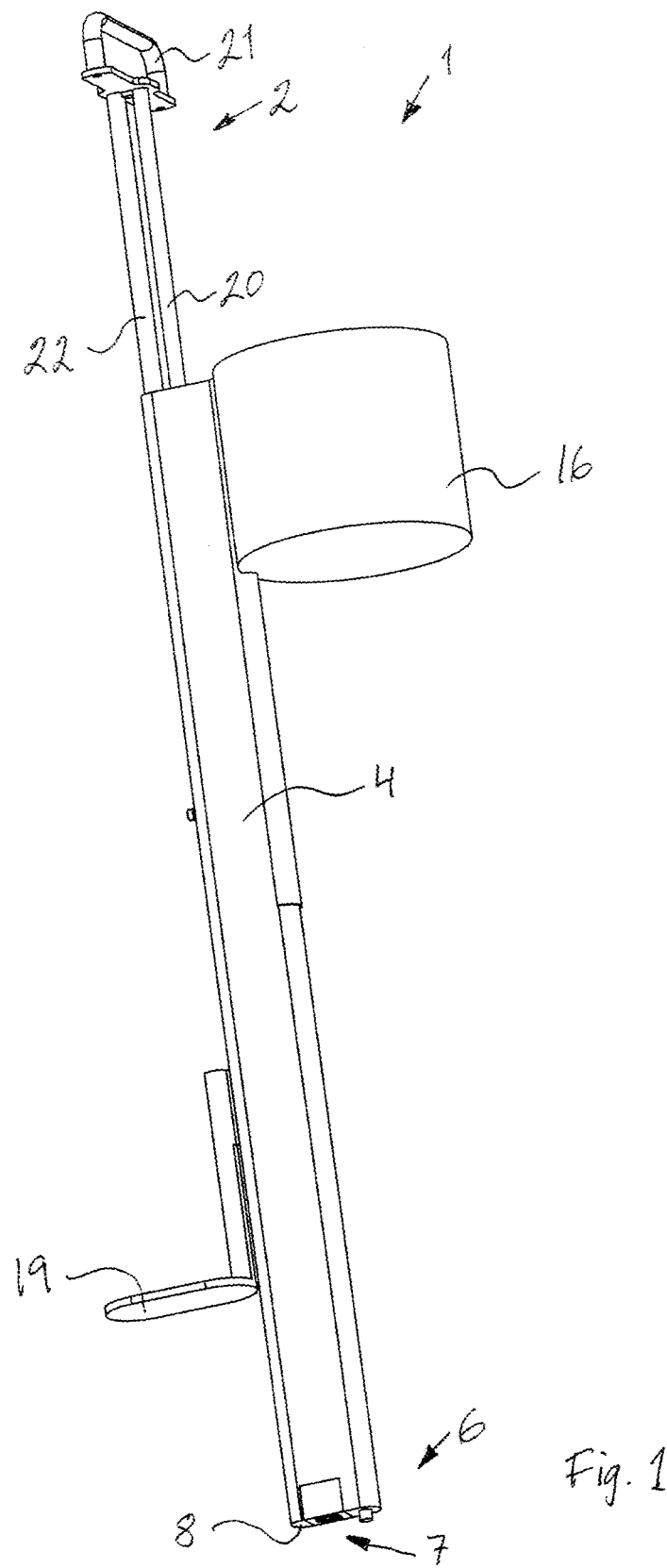
FIG. 1 shows a first embodiment of a mounting device according to the invention.
Figure 2:
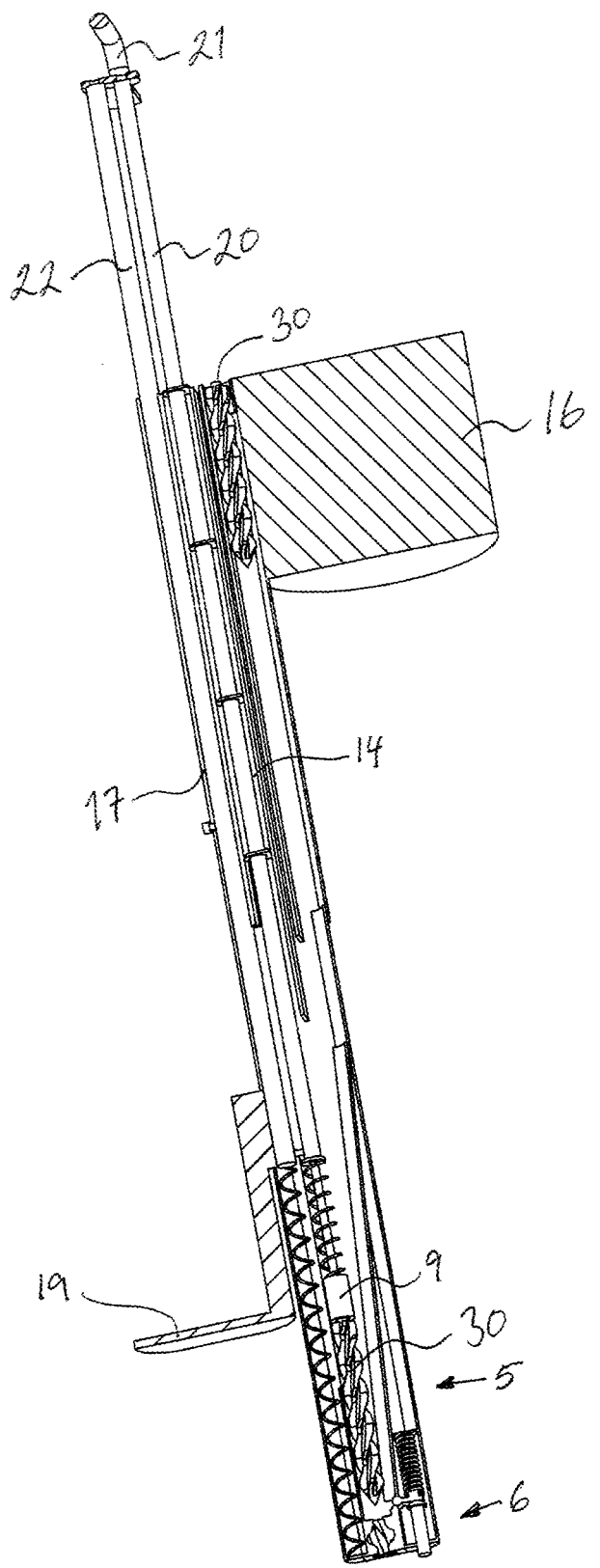
FIG. 2 shows a cut view of a mounting device according to the invention.
Figure 3:
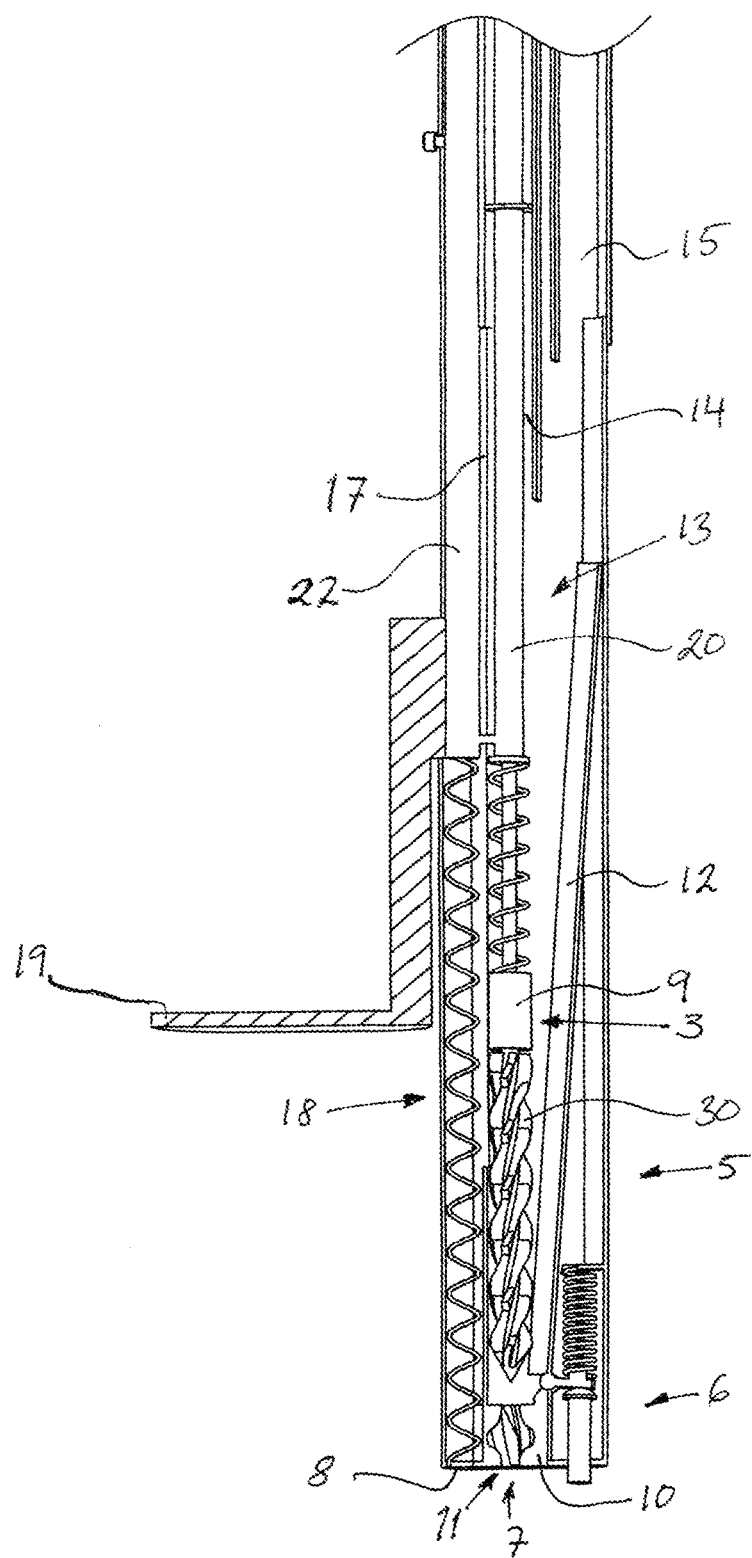
FIG. 3 shows a detail of the mounting device of FIG. 2.
Figure 4:
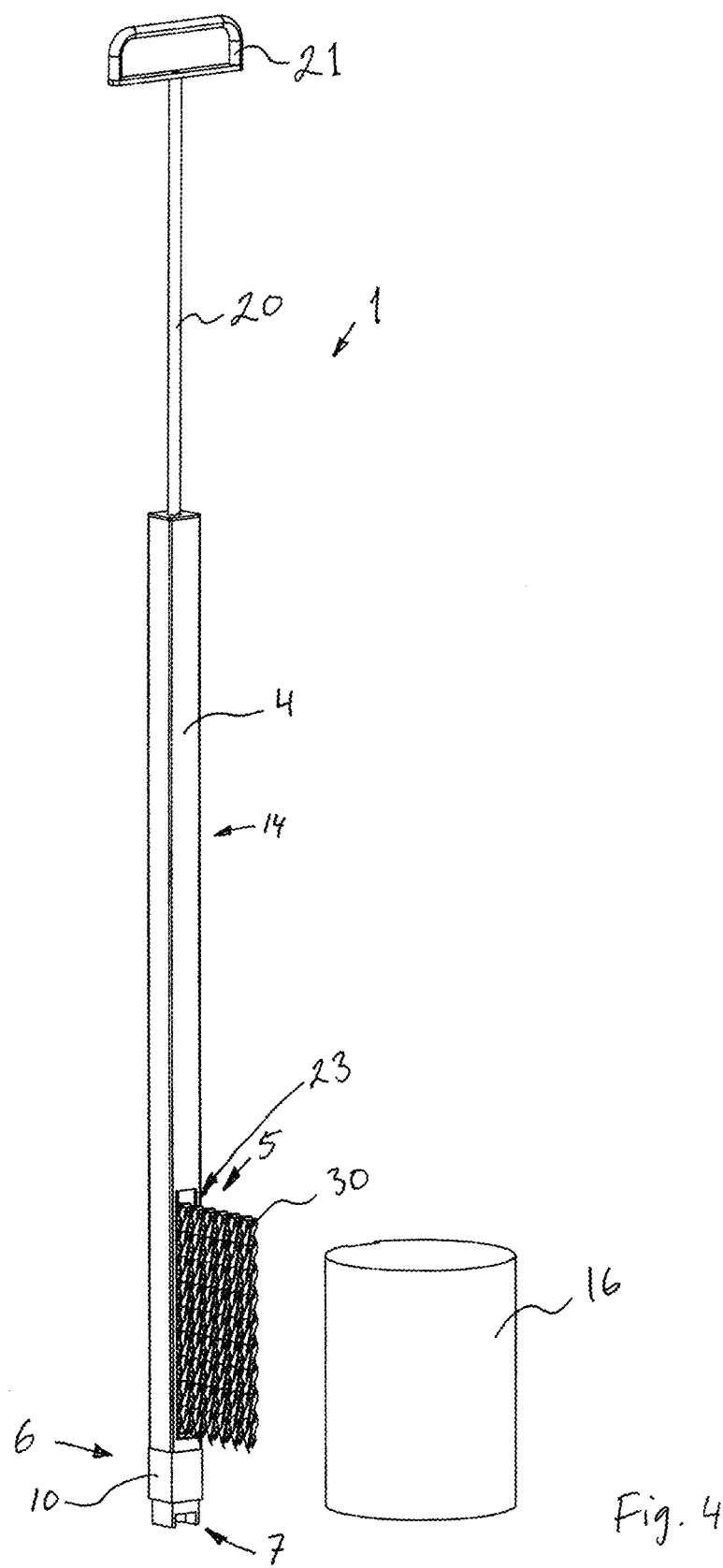
FIG. 4 shows a second example of a mounting device according to the invention.
Figure 5:
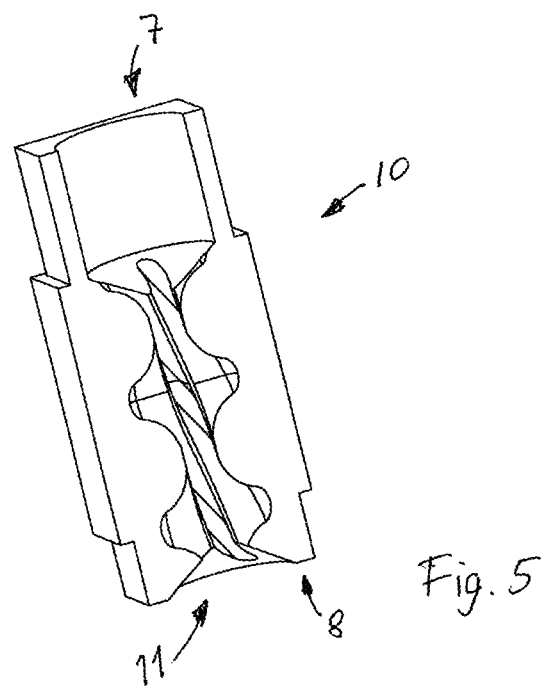
FIG. 5 shows a first example of an insert for the mounting device according to the invention.
Figure 6:
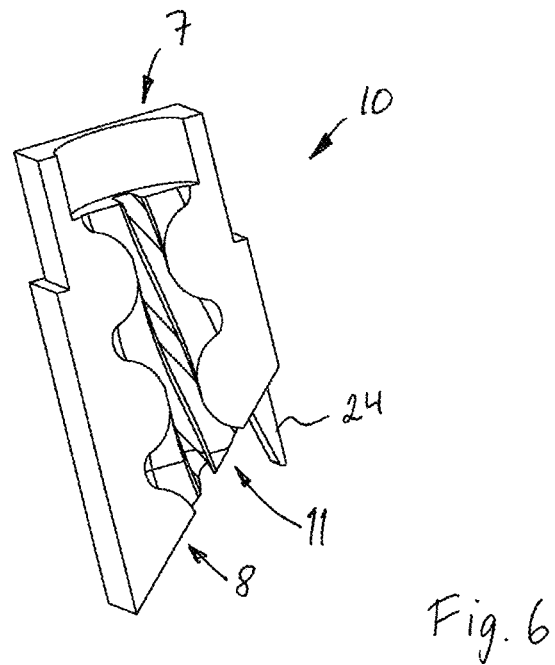
FIG. 6 shows a second example of an insert for the mounting device according to the invention.
Figure 7:
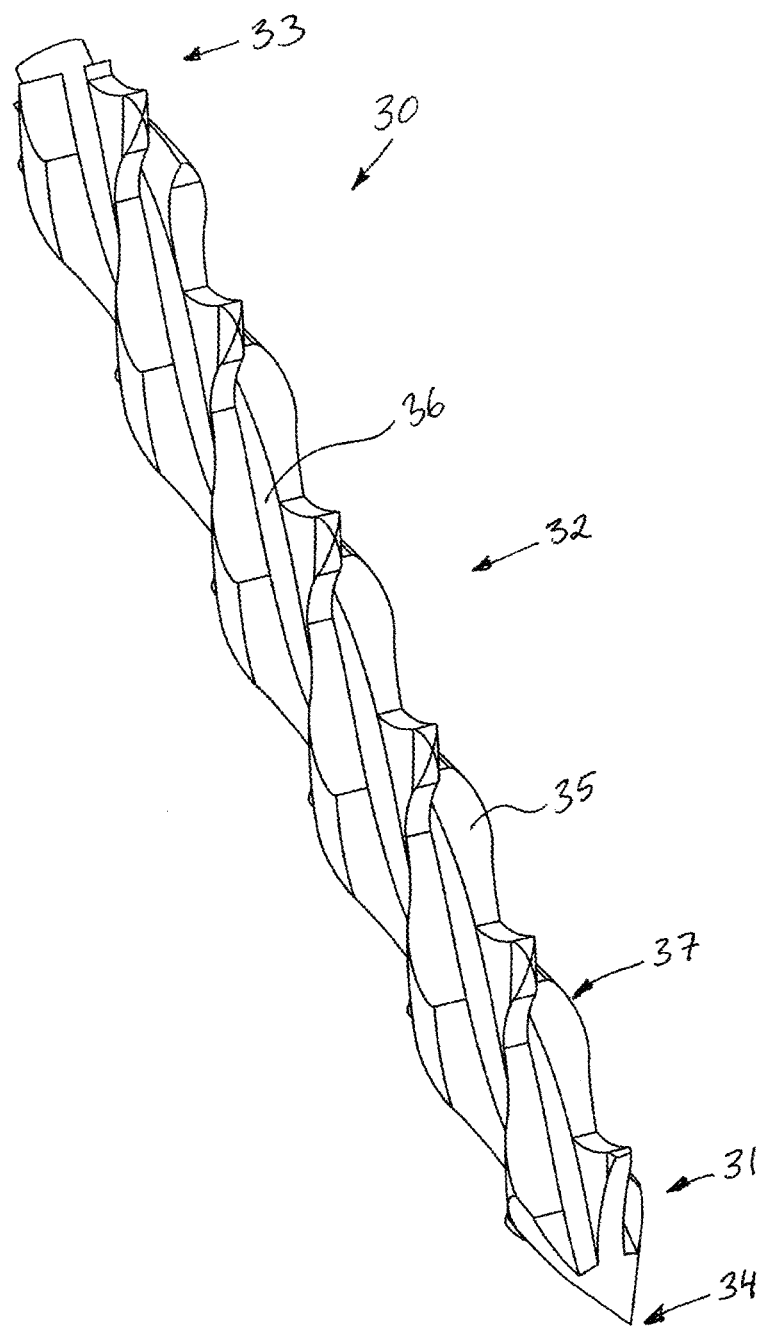
FIG. 7 shows an example of an insulation holder adapted to be used with a mounting device according to the invention.

FIGS. 1, 2 and 3 show a first embodiment of a mounting device according to the invention adapted to insert insulation holders into insulation material, FIG. 4 shows a second example of a mounting device according to the invention, FIGS. 5 and 6 show different inserts for the mounting device according to the invention, and FIG. 7 shows an insulation holder to be used with a mounting device according to the invention.

The mounting device 1 comprises a body 4 that forms the body of the mounting device. The body is in the shown example injection moulded in a plastic material. The body comprises in this example a central channel 14, a second channel 15 and a third channel 17. The central channel is adapted to hold and guide the drive head 3 which is connected to a handle 21 through a first rod 20 which is supported by the central channel. The second channel is adapted to guide an insulation holder 30 from an upper insertion position to a receiving position 5 in the central channel 14. The central channel is provided with a longitudinal slot 13 between the central channel and the second channel, through which an insulation holder can be transferred to the receiving position. In the receiving position, the insulation holder will rest with the tip at the central opening.

The body is provided with a head portion 6 at the lower end of the mounting device. The head portion is provided with an insert 10 having a bearing surface 8 adapted to bear on the insulation material when an insulation holder is inserted. The insert 10 comprises the central opening through which the insulation holders are inserted. The central opening of the insert is provided with a threaded portion 11 adapted to rotate an insulation holder during the insertion. The threaded portion 11 is provided with a thread corresponding to the insulation holder that is to be used. The lead pitch of the threaded portion is at least 30 millimetres. The insert may be removable such that it can be replaced if it is worn, or if an insulation holder with another thread or length is to be used. Inserts having different thread lengths can also be used. If straight insulation holders that are not provided with a thread are to be used, an insert without a thread may be used. The length of the threaded insert is preferably long enough to be able to support the insulation holder during insertion of the insulation holder into the insulation material. The length of the insert may e.g. correspond to the lead pitch of an insulation holder, or to a quarter of the lead pitch of an insulation holder.

The head portion may further be provided with a tilting plate (not shown) which is adapted to angle the mounting device with respect to the insulation material. The tilting plate may be a tiltable, adjustable plate that is hingedly attached to the head portion, or it may be a separate plate that is attached to the head portion or to the mounting device when insulation holders are to be inserted into the insulation material with a predefined angle. When separate plates are used, each plate may be provided with a fixed predefined tilting angle. In this way, insulation holders may be inserted with an angle, which may be of advantage in some cases. It is also possible to provide the insert with a fixed angled bearing surface.

The drive head 3 is in the shown example provided with a coaxial bushing 9 which is arranged around the drive head. The bushing is mounted to the drive head in a resilient manner, such that the bushing can move up and down in a vertical direction on the drive head. In a start position, where the drive head is in its highest position, the lower edge of the bushing will extend somewhat below the bearing surface of the drive head. In this way, the insulation holder will be held in a secure way, where the head of the insulation holder is enclosed by the bushing. The upper part of the insulation holder will thus be supported in a sideway direction during the insertion.

The third channel 17 is adapted for a foot pedal 19. The foot pedal is mounted through a slit 18 in the third channel to a second rod 22 suspended in the third channel. The second rod 22 is connected to the handle 21. In this way, the foot pedal or the handle can be used to push the drive head downwards. The foot pedal may be advantageous when longer insulation holders are used, or when an insulation material having a higher density is used. The length of the slit 18 in the third channel 17 is preferably adapted to the longest of the different insulation holders that are to be used. By providing the second rod with e.g. threaded holes, it is possible to set the start position and the end position of the drive head by inserting screws in corresponding threaded holes. The slit for the start/end adjustment may be the same as for the foot pedal, or may be another slit arranged closer to the handle. The start/end adjustment may also be made in other ways, e.g. by using an adjustable cover over the slit 18.

The drive head has a stroke length corresponding to the longest insulation holder that is to be inserted. The length of an insulation holder may e.g. vary between 5 cm to up to 40 cm. The stroke length of the drive head is thus preferably in the same region. By adjusting the stroke length of the drive head to the actual length of an insulation holder, no excessive travel of the drive head must be performed every time an insulation holder is inserted.

An insulation holder is in the shown example inserted into the second channel, which is adapted to guide an insulation holder 30 from an upper insertion position to a receiving position 5 in the central channel 14. By using a second channel, the inlet for insulation holders and the magazine can be positioned at the upper part of the mounting device. The upper insertion position may be provided with e.g. a funnel in order to simplify the feeding of insulation holders to the second channel. The insulation holder is inserted into the upper part of the second channel and falls down to the central channel to the receiving position, through the longitudinal slot 13 provided between the central channel and the second channel. In the receiving position, the insulation holder will rest with the tip at or in the central opening. It is possible to provide the central opening or the receiving position with a holder means of some kind that will hold the insulation holder in the receiving position before the insulation holder is inserted. A holding means may also be provided at the tip of the insulation holder, e.g. a small protruding tip. This will secure that a straight insulation holder does not fall out of the central opening by gravity.

The mounting device may also be provided with a magazine 16 arranged at the second channel, e.g. at the insertion position at the upper part of the second channel. The magazine is preferably removable, such that it can easily be attached to and removed from the mounting device. The magazine is adapted to hold a plurality of insulation holders, e.g. 50 or more. The magazine may be loaded with insulation holders at a remote place, or may be loaded by the user at e.g. the building site. In one example, the insulation holders are provided in a package that can be inserted directly into the magazine. Every time the drive head returns to its start position, a new insulation holder is released from the magazine by a release means, e.g. operated by a pin provided on the first rod 20. In FIG. 2, one insulation holder is shown at the receiving position 5, and one insulation holder is shown at the insertion position of the second channel, in the magazine. In a mounting device comprising only the central channel, the magazine will release the insulation holders directly to the central channel.

The mounting device is further provided with a positioning means 12 that is adapted to push the insulation holder completely into the receiving position before an insulation holder is inserted. The positioning means is operated by a spring-loaded pin that extends out of the bearing surface of the head portion. When the bearing surface bears on the insulation material, the pin is pushed upwards which causes the positioning means to pivot around its lower part, which causes the upper part to swing inwards. This will push the upper part of the insulation holder into the central channel, to a position where the insulation holder is aligned with the drive head 3 and the bushing 9.

FIG. 4 shows a second example of a mounting device according to the invention. The mounting device 1 in this example comprises a body 4 that forms the body of the mounting device. The body is in the shown example square and is injection moulded in a plastic material. The body comprises in this example only a central channel 14 and a handle 21. The central channel is adapted to hold and guide the drive head 3 that is connected to the handle 21 through a first rod 20 that runs in and is supported by the central channel. The body, and thus also the central channel, is provided with a longitudinal slot 23 through which an insulation holder can be transferred to the receiving position from a magazine 16. In the receiving position, the insulation holder will rest with the tip at the central opening. The magazine is in this example positioned at the lower part of the mounting device, close to the receiving position for the insulation holder.

The body is provided with a head portion 6 at the lower end of the mounting device. The head portion is provided with an insert 10 having a bearing surface 8 adapted to bear on the insulation material when an insulation holder is inserted. The insert 10 comprises the central opening through which the insulation holders are inserted into the insulation material. The central opening of the insert is provided with a threaded portion 11 adapted to rotate an insulation holder during the insertion. The threaded portion 11 is provided with a thread corresponding to the insulation holder that is to be used. The lead pitch of the threaded portion is at least 30 millimetres. The insert may be removable such that it can be replaced. FIGS. 5 and 6 show different examples of inserts that are suitable to be used with a mounting device.

FIG. 5 shows a straight insert that can be attached to the mounting device. The length of the insert may differ. A longer insert will allow the insulation holder to be inserted into the insulation material with the head of the insulation holder aligned with the surface of the insulation material. If a shorter insert is used, the insulation holder may be pushed into the insulation material with a few centimetres since the drive head will be able to extend out of the insert.

Due to the long lead pitch of the insulation holder, the insulation holder will continue to rotate in the insulation material even when the thread of the insulation holder has passed the threaded portion of the insert. The insulation holder will create a threaded passage in the insulation material due to the rotation of the insulation holder, and this passage will continue to steer and rotate the insulation holder when the insulation holder is pushed further into the insulation material. In this way, shorter insulation holders may be used to attach two blocks of insulation material. It is e.g. possible to attach two 10 centimetres blocks with a 10 centimetres insulation holder by inserting the insulation holder 5 centimetres into the upper block.

It is also possible to let the insulation holder extend out of the insulation material with a few centimetres by using an insert where the lower part of the insert is not provided with a thread. In this way, the drive head will stop a few centimetres above the surface of the insulation material. The insert shown in FIG. 5 could be used for this purpose by turning it upside down.

FIG. 6 shows another example of an insert. In this example, the insert is provided with a fixed angled bearing surface such that the mounting device can be used to insert insulation holders with an angle into the insulation material. The bearing surface 8 may in this case be provided with a pointed tip 24 that will sink into the insulation material and will secure the position of the mounting device during insertion of an insulation holder.

An insulation holder 30 enters in the example shown in FIG. 4 the central channel directly through slot 23. The insulation holders are preferably attached to each other by small connecting strips that hold the insulation holders together. The first insulation holder extends into the central channel when the drive head is in its upper position. The second insulation holder is held in a fixed state by a holding means, arranged in either the mounting device or the magazine. When the drive head is lowered, the connecting strips are cut such that the first insulation holder is disconnected from the rest of the insulation holders. The insulation holder enters the central opening and is inserted into the insulation material by the drive head. The tip of the insulation holder is arranged close to the central opening of the insert, i.e. at the receiving position. The magazine is in this example arranged at the lower part of the mounting device.

When an insulation holder is to be inserted, the mounting device is positioned at the position where the insulation holder is to be inserted. If an insulation holder is already present at the receiving position, the drive head is pushed downwards, either by the use of the handle or by the foot pedal. The drive head will push the insulation holder downwards through the central opening. The thread of the insulation holder and the threaded portion of the central opening will interact, such that the insulation holder will rotate through the central opening. In this way, the insulation holder will be screwed down into the insulation material. When most of the insulation holder is inserted into the insulation material, the bushing will reach the upper side of the insert. The bushing will stop at the upper side of the insert, and the drive head will continue to push the insulation holder through the central opening until the complete insulation holder has passed the threaded section of the central opening.

In one example, it is possible to adjust the end position of the drive head somewhat, such that the drive head may stop when the insulation holder is not completely inserted into the insulation material, or such that the insulation holder can be pushed down into the insulation material with a few extra centimetres. Depending on the type of insulation holder, the head of the insulation holder may not be provided with a thread. In one example, the non-threaded head is e.g. 0.5-1 centimetre long. Part of the insulation holder may extend out of the insulation material when the insulation material should be secured to the concrete.

Instead of adjusting the end position of the drive head, or to use inserts with different lengths, it is possible to attach a distance means to the bearing surface in order to allow the insulation holder to extend out of the insulation material. In this case, the drive head will stop when the drive head is aligned with the bearing surface. By attaching a distance means with a predefined thickness to the bearing surface, e.g. 2 centimetres, the drive head will stop when the drive head is 2 centimetres above the insulation surface. The insulation holder will now extend out of the insulation material by 2 centimetres. The opening in the distance means is larger than the outer diameter of the insulation holder. In this way, the mounting device will be easy to lift from the insulation holder, since the thread of the insulation holder is not stuck in a threaded portion of the head portion.

In another example of a mounting device 1 according to the invention, the drive means 2 is an electric motor (not shown) arranged at the upper part of the mounting device. The motor may be an integrated motor or may be a conventional electric screwdriver that is attached to the mounting device by an attachment means. The motor drives the drive head downwards in the same way as described above. The rotation of the motor is transferred to a linear motion by e.g. an internal thread in the central channel. The drive head is in this example preferably provided with a spring-loaded return mechanism that releases when the drive head reaches the end position and returns the drive head to the start position without having to drive the drive head back with the motor. This will save time. In this example, the handle and the foot pedal are not necessary, and the third channel may also be omitted.

FIG. 7 shows an example of an insulation holder 30 that is adapted to be used with the mounting device 1. The shown insulation holder is provided with at least one thread. The insulation holder comprises a tip 31, a body 32 and a head 33. The tip is preferably pointed with a sharp point 34. This will simplify the insertion of an insulation holder into the insulation material. The body 32 is elongated with a solid core 36 and is provided with one or more threads 35, in the shown example four threads. The head 33 is the upper part of the insulation holder and the outer diameter of the head may be smaller than the diameter of the insulation holder, or may have the same diameter and shape. In one example, the diameter of the head corresponds to the diameter of the core of the insulation holder. In this way, the head will easily pass through the central opening of the mounting device. The length of the head can vary, and may be e.g. up to 3 centimetres. The head will correspond to the opening in the bushing 9, such that the bushing will be able to guide the insulation holder in a secure way. The head may also be provided with a thread. In this case, the opening of the bushing must be larger, such that the bushing can also hold the thread of the insulation holder.

The thread 35 of an insulation holder may have a different number of threads and may have a different lead pitch. In one example, the insulation holder comprises four threads with a lead pitch of approximately 80 millimetres. The outer diameter of the insulation holder is 16 millimetres, the core diameter is 6 millimetres and the shown length is 12 centimetres. Other numbers of threads and other dimensions are of course possible, depending on the intended use of the insulation holder. The lead pitch must be relatively large in order to be able to push an insulation holder through the treaded portion of the central opening. A suitable lead pitch is at least 30 millimetres, and may e.g. be in the range between 60-90 millimetres. At the same time, a too long lead pitch will decrease the holding force of an insulation holder in the insulation material. A lead pitch is thus preferably below 100 millimetres. Outer diameters between 10-40 millimetres may be used, and lengths between 5-40 centimetres are possible.

The shown insulation holder is made in a plastic material. The material may be fibre reinforced if the requirements are high. Polypropylene is one suitable plastic material. In the shown example, the outer edge 37 of a thread varies in height from the core. By allowing the outer edge of a thread to vary in height, it is possible to injection mould the insulation holder in a two-part injection tool. This simplifies the production of insulation holders considerably. The thread is still continuous enough to be able to cooperate with the threaded portion of a central opening.

It is also possible to use straight insulation holders that are not provided with a thread. Such an insulation holder is preferably provided with a pointed tip and an elongated body having a protruding holding means arranged at the tip. The insulation holder may be circular or may have another cross section, such as a square shape or a cross-shape. The head of a straight insulation holder preferably has the same diameter and/or shape as the body, such that it can be pushed through the central opening of the head portion. A straight insulation holder is suitable when insulation panels must only be held together sideways, since a straight insulation holder without a head can only take up small longitudinal forces.

The invention is not to be regarded as being limited to the embodiments described above, a number of additional variants and modifications being possible within the scope of the subsequent patent claims.

REFERENCE SIGNS

1: Mounting device
2: Drive means
3: Drive head
4: Body
5: Receiving position
6: Head portion
7: Central opening
8: Bearing surface
9: Bushing
10: Insert
11: Threaded portion
12: Positioning means
13: Slot
14: Central channel
15: Second channel
16: Magazine
17: Third channel
18: Slit
19: Foot pedal
20: First rod
21: Handle
22: Second rod
23: Slot
24: Pointed tip
30: Insulation holder
31: Tip
32: Body
33: Head
34: Point
35: Thread
36: Core
37: Edge

What is claimed is:

1. A mounting device for inserting insulation holders in insulation material, where the mounting device comprises a drive means having a drive head adapted to move from a start position to an end position with a non-rotating movement, where the drive head is adapted to drive an insulation holder into the insulation material, where the mounting device comprises an elongated body having a central channel having a receiving position adapted to hold an insulation holder before insertion, and a head portion comprising a central opening, wherein the central opening is provided with a threaded portion, where the lead pitch of the threaded portion is at least 30 millimetres.

2. The mounting device according to claim 1, wherein the head portion comprises an insert provided with the central opening.

3. The mounting device according to claim 1, wherein the drive head comprises a coaxial bushing resiliently suspended at the drive head, where the bushing is adapted to bear on an insulation holder during the first part of the insertion.

4. The mounting device according to claim 1, wherein the drive head is adapted to drive the insulation holder completely through the threaded portion of the central opening.

5. The mounting device according to claim 4, wherein the central channel is provided with a longitudinal slot adapted to transfer an insulation holder to the receiving position.

6. The mounting device according to claim 5, wherein the mounting device is provided with a second channel adapted to guide an insulation holder from an insert position to the receiving position.

7. The mounting device according to claim 6, wherein the mounting device is provided with a positioning means adapted to push an insulation holder from the second channel to the receiving position.

8. The mounting device according to claim 1, wherein the mounting device comprises a magazine holding a plurality of insulation holders, where the magazine is removably attached to the mounting device.

9. The mounting device according to claim 1, wherein the head portion comprises an angled bearing surface adapted to bear on the insulation material during insertion of an insulation holder.

10. The mounting device according to claim 1, wherein the start position of the drive head can be set by a user.

11. The mounting device according to claim 1, wherein the end position of the drive head can be set by a user.

12. The mounting device according to claim 1, wherein the drive means is a handle which is connected to the drive head with a first rod.

13. The mounting device according to claim 1, wherein the drive means comprises an electrical motor.

14. A method for inserting an insulation holder provided with at least one thread having a lead pitch of at least 30 millimetres into insulation material using a mounting device, comprising the following steps:
   placing an insulation holder inside the mounting device,
   placing the mounting device to bear against the insulation material,
   driving the insulation holder through a central opening of the mounting device by the use of a drive means, where the central opening is provided with a threaded portion corresponding to the thread of the insulation holder.

15. The method according to claim 14, wherein the drive means is a manually operated handle.

* * * * *